United States Patent
Arroyo et al.

(10) Patent No.: US 10,417,168 B1
(45) Date of Patent: Sep. 17, 2019

(54) COMBINING SWITCH SLOT RESOURCES

(71) Applicant: INTERNATIONAL BUSINESS MACHINES CORPORATION, Armonk, NY (US)

(72) Inventors: Jesse P. Arroyo, Rochester, MN (US); Ellen M. Bauman, Rochester, MN (US); Daniel Larson, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/921,126

(22) Filed: Mar. 14, 2018

(51) Int. Cl.
G06F 13/40 (2006.01)
G06F 13/42 (2006.01)
G06F 13/38 (2006.01)

(52) U.S. Cl.
CPC ...... G06F 13/4282 (2013.01); G06F 13/4022 (2013.01); G06F 13/4027 (2013.01); G06F 13/4068 (2013.01); G06F 13/385 (2013.01); G06F 2213/0026 (2013.01)

(58) Field of Classification Search
CPC .......... G06F 13/4282; G06F 13/4027; G06F 13/4068; G06F 13/4022; G06F 13/385; G06F 2213/0026
See application file for complete search history.

(56) References Cited

U.S. PATENT DOCUMENTS

| | | |
|---|---|---|
| 6,883,057 B2 | 4/2005 | Moy |
| 9,304,849 B2 | 4/2016 | Arroyo et al. |
| 2010/0257301 A1* | 10/2010 | Kloeppner ............ G06F 13/385 710/313 |
| 2015/0026385 A1 | 1/2015 | Egi et al. |
| 2016/0034415 A1 | 2/2016 | Singh et al. |
| 2016/0335216 A1 | 11/2016 | Krishnan et al. |
| 2017/0046293 A1 | 2/2017 | Lasater |

FOREIGN PATENT DOCUMENTS

| | | |
|---|---|---|
| CN | 103281260 A | 9/2013 |
| CN | 106326160 A | 1/2017 |

OTHER PUBLICATIONS

Anonymous, "Method for assigning bus holes for downstream bridges in a dynamic PCIe switch", An IP.com Prior Art Database Technical Disclosure, IP.com No. IPCOM000216461D, IP.com Electronic Publication Date: Apr. 9, 2012, pp. 1-4.
Krishnan, "Evaluation of an Integrated PCI Express IO Expansion and Clustering Fabric", HOTI '08 Proceedings of the 2008 16th IEEE Symposium on High Performance Interconnects, Stanford, CA, USA, Aug. 26-28, 2008, IEEE Computer Society Washington, DC, USA, copyright 2008, p. 93-100.

* cited by examiner

Primary Examiner — Ernest Unelus
(74) Attorney, Agent, or Firm — L. Jeffrey Kelly (57) ABSTRACT

According to an embodiment, a system, a method, and/or a computer program product is provided to allow a choice of allocating resources of a processor host bridge (PHB) at initial setup of a computer system to a group of peripheral component interconnect express (PCI-E) slots via a PCI-E switch, or alternatively to allocate resources of the PHB directly to a single PCI-E slot. The system may include a PHB, a first switch connected to the PHB, where the first switch is a simple circuit, a second switch connected to the first switch, where the second switch is a simple circuit, a PCI-E switch connected to the first switch and connected to the second switch, and a first PCI-E slot connected to the second switch.

20 Claims, 5 Drawing Sheets

COMBINING SWITCH SLOT RESOURCES

BACKGROUND

The present invention relates, generally, to the field of computing, and more particularly to server computers.

Peripheral Component Interconnect Express (hereinafter "PCI-E") is a high speed serial computer expansion bus standard. A computer or a server may include expansion or adapter slots which accept PCI-E expansion cards inserted into the expansion slots. The PCI-E interface allows high bandwidth communication between the PCI-E expansion cards and other system components, for example a motherboard, a central processing unit, and memory. Types of PCI-E expansion cards include video cards, sound cards, USB expansion cards, hard drive controller cards, adapter cards, and network interface cards. A PCI-E switch is used to interconnect the PCI-E cards in the PCI-E slots with the processor or central processing unit, and other components. In a server, the number of PCI-E slots is fixed at initialization and there is a fixed amount of resources assigned to each slot.

SUMMARY

According to an embodiment, a system, a method, and/or a computer program product is provided. The system may include a processor host bridge (PHB), a first switch connected to the PHB, where the first switch is a simple circuit, a second switch connected to the first switch, where the second switch is a simple circuit, a peripheral component interconnect express (PCI-E) switch connected to the first switch and connected to the second switch, and a first PCI-E slot connected to the second switch.

According to an embodiment, a system is provided, the system may include a first bus connecting a processor host bridge (PHB) and a first simple circuit switch, a second bus connecting the first switch and a second simple circuit switch, and a third bus connecting the second switch and a PCI-E slot.

According to an embodiment, a processor-implemented method for allocating resources managed by a processor host bridge (PHB) to a single peripheral component interconnect express (PCI-E) slot is provided, the method may include controlling a simple circuit first switch and a simple circuit second switch in order to connect the PHB directly to the single PCI-E slot upon initialization of a system.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to server computers. The following described exemplary embodiments provide a system, and method to, among other things, allow the resources from a processor host bridge (hereinafter "PHB") to be directly used by a single Peripheral Component Interconnect Express (hereinafter "PCI-E") expansion slot, rather than the resources being allocated through a PCI-E switch to more than one PCI-E expansion slot. Therefore, the present embodiment has the capacity to improve the technical field of computing by allowing use of an expansion card in the single PCI-E expansion slot which uses higher resources than would be available in a PCI-E expansion slot which has the PHB resources allocated through the PCI-E switch to more than one PCI-E expansion slot. The resources from the PHB may include Partitionable Endpoint Numbers, an amount of memory-mapped I/O (MMIO) address space, an amount of direct memory access (DMA) address space, and Message Signaled Interrupts (MSIs).

As previously described, PCI-E is a high speed serial computer expansion bus standard. A computer or a server may include expansion or adapter slots which accept PCI-E expansion cards inserted into the corresponding expansion slots. The PCI-E interface allows high bandwidth communication between the PCI-E expansion cards and other components, for example a motherboard, a central processing unit, and memory. Types of PCI-E expansion cards include video cards, sound cards, USB expansion cards, hard drive controller cards, adapter cards, and network interface cards. A PCI-E switch is used to interconnect the PCI-E cards in the PCI-E slots with the processor or central processing unit, and other components. In a server, the number of PCI-E slots is fixed at initialization and there is a fixed amount of resources assigned to each slot.

The PCI-E switch allows system resources managed by the PHB to be allocated between multiple PCI-E slots via the PCI-E switch. Upon initial setup of a computer system, the allocation of resources of the PHB is set between the multiple PCI-E slots and cannot be modified later. A PCI-E card which requires greater resources than initially allocated to one of the multiple PCI-E slots cannot be in the computer system.

The following described exemplary embodiments provide a system, method, and computer program product to allow a choice of allocating resources of a PHB at initial setup of the computer system to a group of PCI-E slots via a PCI-E switch, or alternatively to allocate resources of the PHB directly to a single PCI-E slot.

Figure 1:
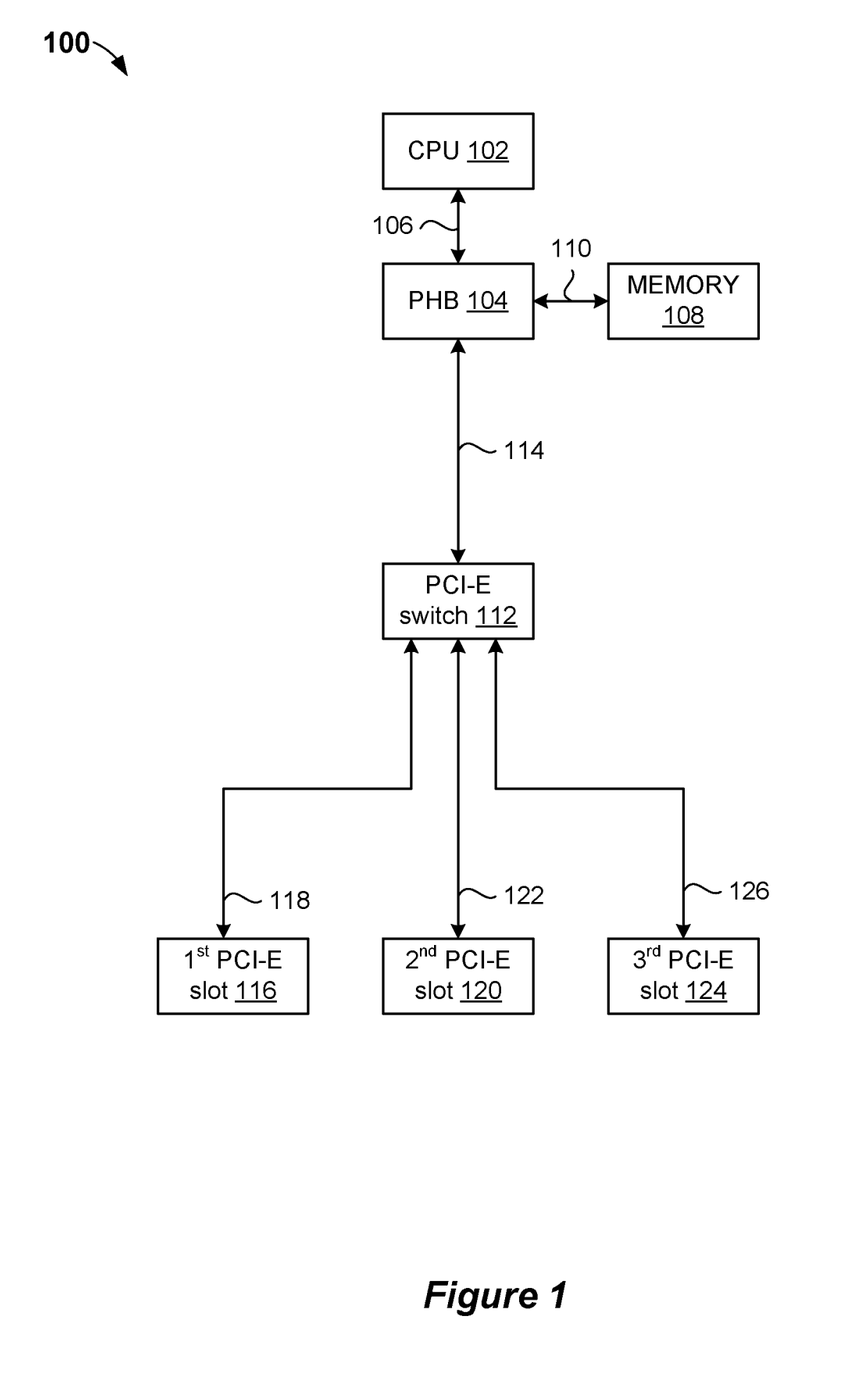
FIG. 1 illustrates a system including a Peripheral Component Interconnect Express (hereinafter "PCI-E) Switch and associated PCI-E slots, according to an embodiment.

Referring to FIG. 1, a system 100 is depicted, according to an embodiment. The system 100 may be a server, a computer, or a device which provides resources and functionality to other devices or computer programs, for example, an application server, a mail server, a database server, or a web server. The system 100 may include a central processing unit (hereinafter "CPU") 102, a processor host bridge (hereinafter "PHB") 104, memory 108, a Peripheral Component Interconnect Express (hereinafter "PCI-E) switch 112, a first PCI-E slot 116, a second PCI-E slot 120, and a third PCI-E slot 124. The CPU 102 may be connected to the PHB 104 by a bus 106. The PHB 104 may be connected to the memory 108 by a bus 110. In an alternate embodiment, the CPU 102 may be connected directly to the memory 108. The PHB 104 may be connected to the PCI-E switch 112 by a bus 114. The PCI-E switch 112 may be connected to the first PCI-E slot 116 by a bus 118. The PCI-E switch 112 may be connected to the second PCI-E slot 120 by a bus 122. The PCI-E switch 112 may be connected to the third PCI-E slot 124 by a bus 126. According to an embodiment, the buses 106, 110, 114, 118, 122, 126, may each be an eight lane bus; however, the various system components can be connected to one another using any known techniques. In a typical bus, each lane may include a pair of wires for electronic signals or communication in either direction or may be bi-directional. In a typical bus, each lane may include a pair of wires for electronic signals or communication in either direction or may be bi-directional. Alternatively, according to an embodiment, each of the buses 106, 110, 114, 118, 122, 126, may be an alternate width, for example, a four or a sixteen lane bus.

Although one CPU 102, one PHB 104, and one PCI-E switch 112 are shown, the system 100 may include any number of CPUs 102, PHBs 104, and PCI-E switches 112. In an embodiment, there may be two or more CPUs 102 each connected to up to six, or more, PHBs 104. In addition, although only three PCI-E slots (116, 120, 124) are shown, the system 100 may include any number of PCI-E slots connected to the PCI-E switch 112. For example, in the illustrated embodiment, the first PCI-E slot 116, the second PCI-E slot 120, and the third PCI-E slot 124 are all connected to the PCI-E switch 112. A typical system configuration will include some multiple of PCI-E slots connected to each PCI-E switch 112.

In an exemplary embodiment, the system 100 may be an input/output (hereinafter "I/O") expansion drawer mounted on a chassis in a rack mountable computer system.

The CPU 102 may be referred to as a microprocessor, a computer chip, or a processor, among other names. The PHB 104 may interconnect signals between components, for example the CPU 102, the memory 108, the PCI-E switch 112, and other components, including a graphics adapter, a Local Area Network (LAN) adapter, and other components. The PCI-E switch 112 may route communication between the PHB 104 and the first PCI-E slot 116, the second PCI-E slot 120, and the third PCI-E slot 124. Typically, according to an embodiment, the PCI-E switch 112 divides available resources amongst the connected PCI-E slots, for example, the first PCI-E slot 116, the second PCI-E slot 120, and the third PCI-E slot 124. For example, an amount of memory-mapped I/O (MMIO) address space may be divided amongst the bus 118 to the first PCI-E slot 116, the bus 122 to the second PCI-E Slot 120, and the bus 126 to the third PCI-E slot 124. As previously described, the first PCI-E slot 116, the second PCI-E slot 120, and the third PCI-E slot 124, may accept PCI-E cards, such as a video card, a sound card, a USB expansion card, a hard drive controller card, an adapter cards, a network interface card, and other PCI-E cards. Therefore, it follows that the system resources are divided amongst each of the three PCI-E cards occupying the three slots 116, 120, 124. The resources may be divided evenly amongst the three slots 116, 120, 124, or alternately, the resources may be divided in unequal amounts.

During initialization, the system 100 allocates resources between the CPU 102, the PHB 104, and the PCI-E slots 116,120, 124. Specifically, the PCI-E switch 112 allocates resources, for example, an amount of memory-mapped I/O (MMIO) address space, from the PHB 104 between the PCI-E slots 116, 120, 124. Once the system resources have been allocated during initialization, they cannot be changed or adjusted. In some examples, allocation of system resources may not be even across the PCI-E slots 116, 120, 124; however, the allocation is fixed and cannot be changed after initialization.

Despite its capabilities in sharing and distributing communications resources, the system 100 has limitations. At the time of initial system release, server release, all types or variants of adapters and PCI-E cards to be supported must be identified. Allocation of resources in each of the PCI-E slots, such as the first PCI-E slot 116, the second PCI-E slot 120, and the third PCI-E slot 124, cannot be changed after initialization. The number of PCI-E slots cannot be changed. Additionally, a PCI-E card which requires a higher resource, or bandwidth, than available in one of the PCI-E slots, cannot be used. Furthermore, unused PCI-E slots have resources assigned to them, which are in turn unused. This is a potential problem, as new versions of adapters and PCI-E cards are released which may not fit the initial system release specification. Additionally, the PCI-E switch as a component with advanced circuitry may produce additionally time delay in signals between the PCH and a PCI-E slot, and in a case where only a single PCI-E slot may be used, the use of the PCI-E switch may add an unnecessary performance lag, which may be minimized by this invention.

It may be appreciated that FIG. 1 provides only an illustration of one implementation and does not imply any limitations with regard to the environments in which different embodiments may be implemented. Many modifications to the depicted environments may be made based on design and implementation requirements.

Figure 2:
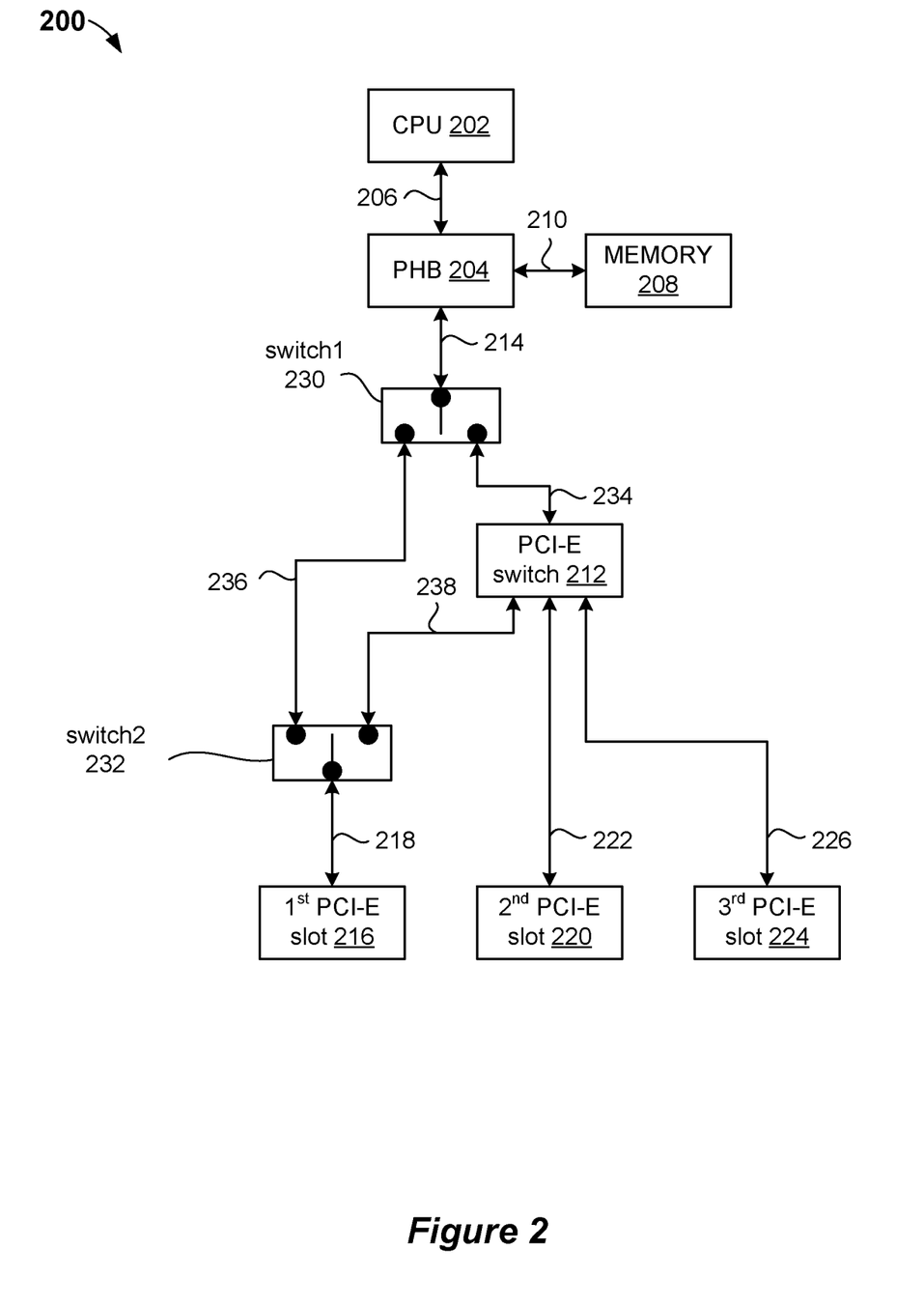
FIG. 2 illustrates a system including a PCI-E Switch and associated PCI-E slots, according to an embodiment.

Referring now to FIG. 2, a system 200 is depicted, according to an embodiment. The system 200 may be a server, a computer, or a device which provides resources and functionality to other devices or computer programs, for example, an application server, a mail server, a database server, or a web server. Like the system 100, the system 200 may include a central processing unit (hereinafter "CPU") 202, a processor host bridge (hereinafter "PHB") 204, memory 208, a Peripheral Component Interconnect Express (hereinafter "PCI-E) switch 212, a first PCI-E slot 216, a second PCI-E slot 220, and a third PCI-E slot 224. Unlike the system 100, the system 200 includes a switch1 230 and a switch2 232. In general, similar to the system 100, the various components of the system 200 are electrically connected via a bus. Specifically, according to the present embodiment, the CPU 202 is connected to the PHB 204 by a bus 206, and the PHB 204 is connected to the memory 208 by a bus 210. In an alternate embodiment, the CPU 202 may be connected directly to the memory 208. The PHB 204 may be connected to the switch1 230 by a bus 214. The switch1 230 may be connected to the switch2 232 by a bus 236. The switch1 230 may be connected to the PCI-E switch 212 by a bus 234. The PCI-E switch 212 may be connected to the switch2 232 by a bus 238. The PCI-E switch 212 may be connected to the second PCI-E slot 220 by a bus 222. The PCI-E switch 212 may be connected to the third PCI-E slot 224 by a bus 226. The switch2 232 may be connected to the first PCI-E slot 216 by a bus 218. The buses 206, 210, 214, 218, 222, 226, 234, 236, 238, may each be an eight lane bus. Each lane may include a pair of wires for electronic signals or communication in either direction or may be bi-directional. Alternatively, according to an embodiment, each of the buses 106, 110, 114, 118, 122, 126, may be an alternate width, for example, a four or a sixteen lane bus.

Although one CPU 202, one PHB 204, and one PCI-E switch 212 are shown, the system 200 may include any number of CPUs 202, PHBs 204, PCI-E switches 212, and switch1s 230. In an embodiment there may be two or more CPUs 202 each connected to up to six, or more, PHBs 204. In addition, although three PCI-E slots (216, 220, 224) are shown, the system 200 may include any number of PCI-E slots connected to the PCI-E switch 212. For example, in the illustrated embodiment, the first PCI-E slot 116, which is connected through the switch2 232, the second PCI-E slot 220, and the third PCI-E slot 224, are all connected to the PCI-E switch 212. A typical system configuration will include some multiple of PCI-E slots connected to each PCI-E switch 212.

In an exemplary embodiment, the system 200 may be an input/output (hereinafter "I/O") expansion drawer mounted on a chassis in a rack mountable computer system.

Components in FIG. 2 may correspond to similarly named components in FIG. 1 and may be functionally similar. The CPU 202 may be referred to as a microprocessor, a computer chip, or a processor. The PHB 204 may interconnect signals between components, for example the CPU 202, the memory 208, the PCI-E switch 212, and other components, including a graphics adapter, a Local Area Network (LAN) adapter, and others. The PCI-E switch 212 may route communication between the PHB 204, and the first PCI-E slot 216, the second PCI-E slot 220, and the third PCI-E slot 224. Typically, according to an embodiment, the PCI-E switch 212 divides available resources amongst the connected PCI-E slots, for example, the first PCI-E slot 216, the second PCI-E slot 220, and the third PCI-E slot 224. For example, an amount of memory-mapped I/O (MMIO) address space may be divided amongst the bus 238 and the 218 to the first PCI-E slot 216, the bus 222 to the second PCI-E Slot 220, and the bus 226 to the third PCI-E slot 224. As previously described, the first PCI-E slot 216, the second PCI-E slot 220, and the third PCI-E slot 224, may accept PCI-E cards, such as a video card, a sound card, a USB expansion card, a hard drive controller card, an adapter cards, a network interface card, and other PCI-E cards. The resources may be divided evenly amongst the three slots 216, 220, 224, or alternately, the resources may be divided in unequal amounts.

The system 200 has additional components compared to the system 100, including the switch1 230 and the switch2 232. The switch1 230 and the switch2 232 each have a first and a second position. In a first mode of operation, as further described in relation to FIG. 3 below, the switch1 230, in a first position, connects the PHB 204 to the PCI-E switch 212, and the switch2 232, in a first position, connects the PCI-E switch 212 to the first PCI-E slot 216. In a second mode of operation, as further described in relation to FIG. 4 below, the switch1 230, in a second position, and the switch2 232, in a second position, connect the PHB 204 to the first PCI-E slot 216.

In the first mode of operation, the PHB 204 and the PCI-E switch 212 are connected via the bus 214 between the PHB 204 and the switch1 230, and via the bus 234 between the switch1 230 and the PCI-E switch 212. Also, in the first mode of operation, the PCI-E switch 212 and the first PCI-E slot 216 are connected via the bus 238 between the PCI-E switch 212 and the switch2 232, and the bus 218 between the switch2 232 and the PCI-E slot 216.

In the second mode of operation, the PHB 204 and the first PCI-E slot 216 are connected via the bus 214 between the PHB 204 and the switch1 230, the bus 236 between the switch1 230 and the switch2 232, and the bus 218 between the switch2 232 and the first PCI-E slot 216.

The two different modes of operation provide two communication routes/paths between the PHB 204 and the first PCI slot 216. The first communication route/path includes the switch1 230, the PCI-E switch 212, and the switch2 232. The second communication route/path includes the switch1 230, and the switch2 232.

A first control signal (not shown) may control the switch1 230 and a second control signal (not shown) may control the switch2 232. The first control signal and the second control signal may determine whether the system 200 is in the first mode of operation or the second mode of operation.

The first control signal and the second control signal may be controlled by the CPU 202. Alternatively, the first control signal and the second control signal may be controlled by a hypervisor, not shown. A hypervisor may be referred to as a virtual machine monitor. The hypervisor may create and run virtual machines. The hypervisor, or virtual machine manager, is firmware or a program which works as if there are multiple computers on the server or system, and the hypervisor allows multiple operating systems to share a single hardware host, where each operating system appears to have the host's processor, memory and other resources. The choice for the first mode of operation or the second mode of operation may be stored in host data (HDAT) and read at boot time to configure the system 200. The HDAT is provided to the hypervisor at run time contains information about the system 200 and a configuration of the system 200. The HDAT may come from system component vital product data (VPD) and may come from a hardware management console.

In the first mode of operation, during initialization, the system 200 allocates resources between the CPU 102, the PHB 104, and the PCI-E slots 216, 220, 224. Specifically, the PCI-E switch 212 allocates resources, for example, an amount of memory-mapped I/O (MMIO) address space, from the PHB 104 between the PCI-E slots 216, 220, 224. Once the system resources have been allocated during initialization, they cannot be changed or adjusted. In some examples, allocation of system resources may not be even across the PCI-E slots 216, 220, 224; however, the allocation is fixed and cannot be changed after initialization.

In the second mode of operation, during initialization, all of the resources of the PHB may be allocated to the first PCI-E slot 216, by the switch1 230 and the switch2 232, where the additional switches are each a simple circuit which have limited circuitry and allow the system 200 to not use the PCI-E switch 212. In the second mode of operation, there is an advantage in not using the PCI-E switch, as the PCI-E 212 switch has advanced circuitry which may have a delay on data flow, compared to operation of the switch1 230 and the switch2 232. This may result in a performance improvement in the second mode of operation compared to the first mode of operation.

It may be appreciated that FIG. 2 provides only an illustration of one implementation and does not imply any limitations with regard to the environments in which different embodiments may be implemented. Many modifications to the depicted environments may be made based on design and implementation requirements.

Figure 3:
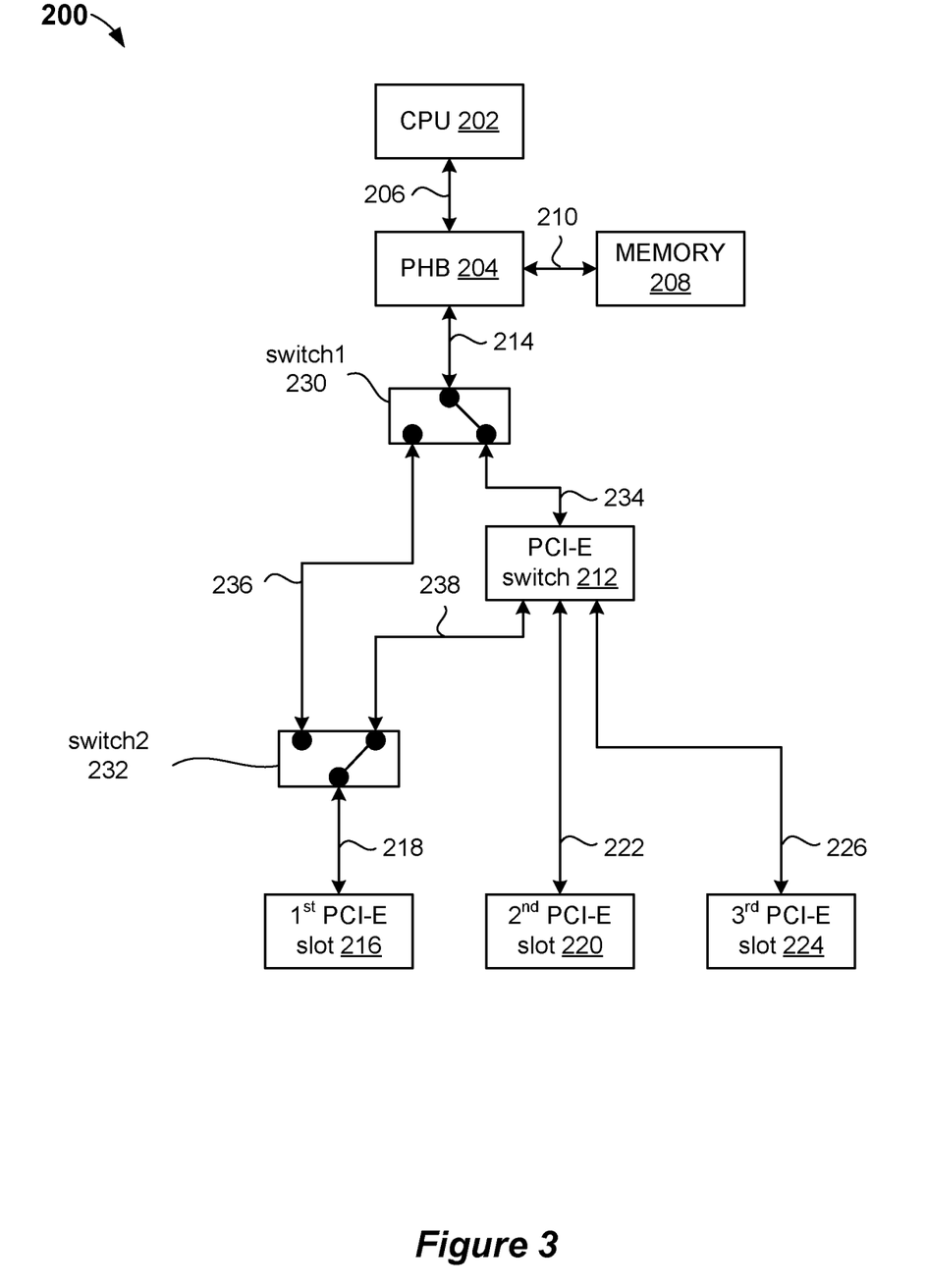
FIG. 3 illustrates a system including a PCI-E Switch and associated PCI-E slots, according to an embodiment.

Referring now to FIG. 3, the system 200 is depicted, according to an embodiment. The system 200 described above is shown in the first mode of operation, as described above.

In the first mode of operation, all of the available PCI-E slots may be accessible by the CPU 202 and other components of the system 200, including the first PCI-E slot 216, the second PCI-E slot 220, and the third PCI-E slot 224. The first mode of operation of the system 200 may operate similarly to the system 100 as described above. The switch1 230 and the switch2 232 may each be a switch with limited circuitry and may not substantially provide any delay in data feed on any of the buses 214, 234, 238 and 218.

Figure 4:
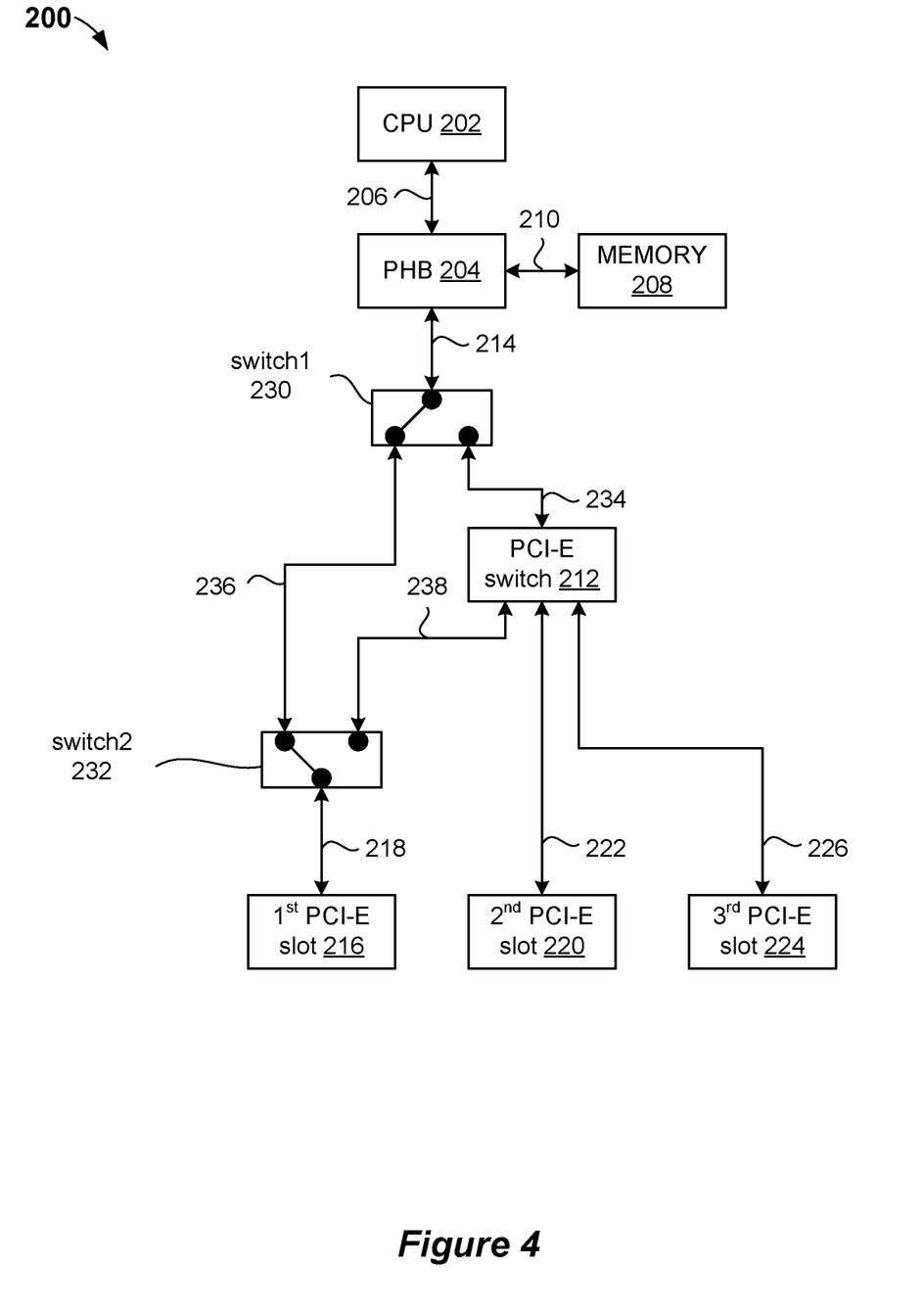
FIG. 4 illustrates a system including a PCI-E Switch and associated PCI-E slots, according to an embodiment.

Referring now to FIG. 4, the system 200 is depicted, according to an embodiment. The system 200 described above is shown in the second mode of operation, as described above.

In the second mode of operation, the first PCI-E slot 216 is the only PCI-E slot accessible by the CPU 202 and other components of the system 200. The PCI-E switch 212, the second PCI-E slot 220, and the third PCI-E slot 224, are not accessible by the CPU 202 and other components of the system 200. The second mode of operation does not use the PCI-E switch 212 and allows the all resources of the PHB 204 to be used by the first PCI-E slot 216. No resources managed by the PHB 204 may be allocated to the second PCI-E slot 220, and the third PCI-E slot 224.

There are many advantages to the system 200 in the second mode of operation.

In the second mode of operation, the PCI-E switch 212 is not being used and the PCI-E switch 212 has advanced circuitry which may add a time lag during operation. Thus, in the second mode of operation, communication between the PHB 204 and the first PCI-E slot 216 may be faster, compared to the system 100 or compared to the first mode of operation of the system 200. The switch1 230 and the switch2 232 may each be a switch with limited circuitry and may not substantially provide any delay in communication on any of the buses 214, 236, and 218. Unlike the PCI-E switch 212 which has complex circuitry, the switch1 230 and the switch2 232 have limited circuitry thus allowing for faster communication between the PHB 204 and the first PCI-E slot 216 in the second mode of operation, in comparison to communication speeds between the PHB 204 and the first PCI-E slot 216 in the first mode of operation.

In essence, the configuration of the disclosed embodiments allows for the option of an enhanced communication path between the PHB 204 and the first PCI-E slot 216, while maintaining the basic communication paths to all three slots via the PCI-E switch 212.

In an embodiment, during initialization in the second mode of operation, the first PCI-E slot 216 may be initialized as a PHB 204 direct slot and the PCI-E switch 212 and the other remaining PCI-E slots, for example the second PCI-E slot 220 and the third PCI-E slot 224, would not be created by the hypervisor. All of the PHB 204 resources will be assigned to the first PCI-E slot 216. The first PCI-E slot 216 may be initialized to allow insertion of a cable card, which may be used to plug in an expansion drawer. A cable card allows viewing and recording of digital cable television channels. An expansion drawer may accept a fanout module.

In an embodiment, during initialization in the second mode of operation, the first PCI-E slot 216 may be initialized as a direct slot, and an expansion module may be inserted in the first PCI-E slot 216. The fan out expansion module may provide an increased number of PCI-E slots, for example six slots may be available, instead of the 3 slots originally provided. In an embodiment, a direct slot expansion module may be inserted in the first PCI-E slot 216. The direct slot expansion module may allow an adapter to be used which requires more power and cooling capabilities than can be otherwise be supported in the first mode of operation.

Figure 5:
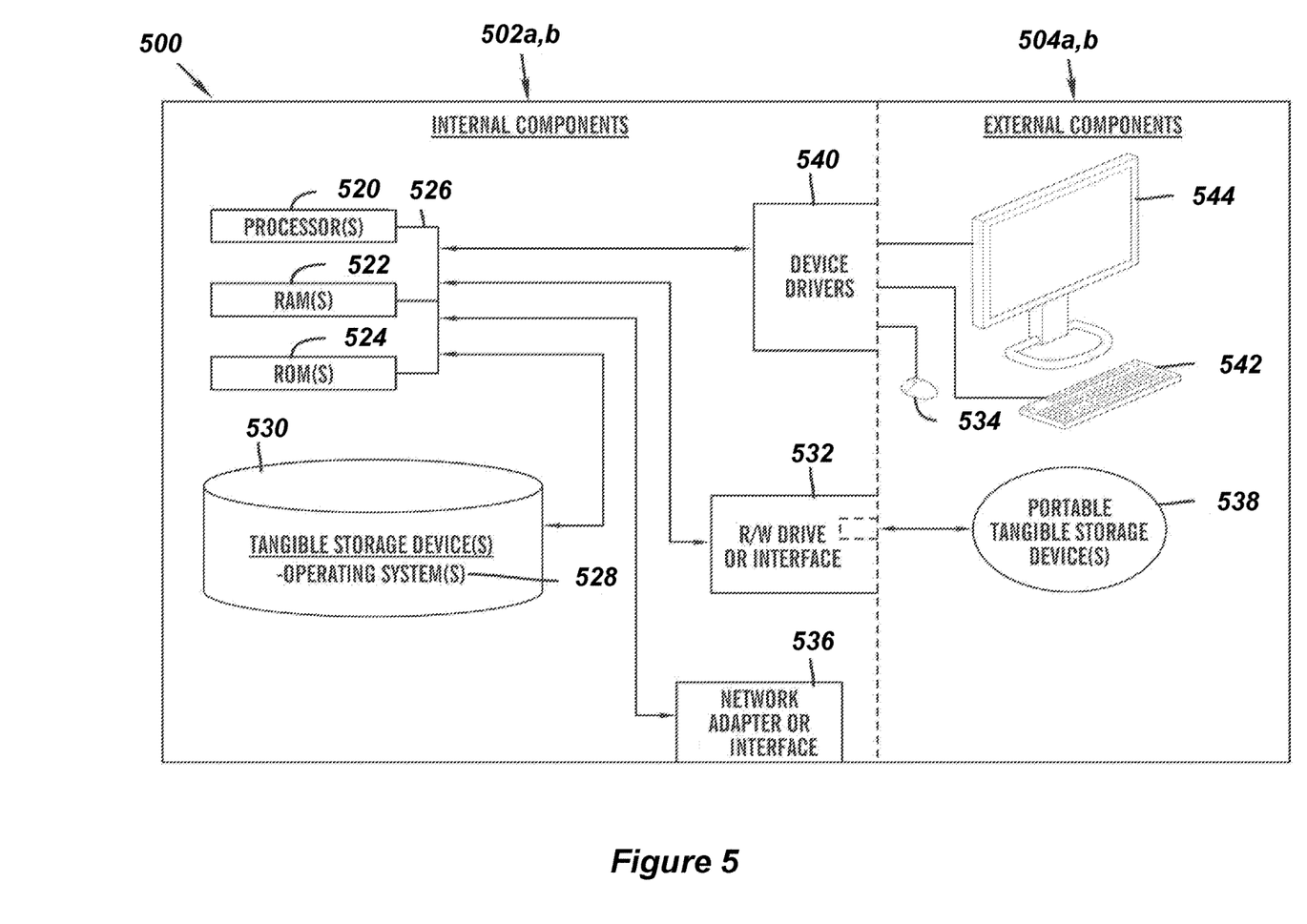
FIG. 5 is a block diagram of internal and external components of computers and servers, according to an embodiment.

FIG. 5 is a block diagram 500 of internal and external components of a client computing device or a server as described above, in accordance with an embodiment of the present invention. It should be appreciated that FIG. 5 provides only an illustration of an implementation and does not imply any limitations with regard to the environments in which different embodiments may be implemented. Many modifications to the depicted environments may be made based on design and implementation requirements.

Data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may be represented by the data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device and the server may include respective sets of internal components 502 *a,b* and external components 504 *a,b* illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, and other executable instructions in the server are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 *a,b* also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program can be stored on one or more of the respective portable computer-readable tangible storage devices 538, read via the respective R/W drive or interface 532, and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. Software programs can be downloaded to the client computing device and the server from an external computer via a network (for example, the Internet, a local area network or other, wide area network) and respective network adapters or interfaces 536. From the network adapters or interfaces 536, the software programs may be loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system, the system comprising:
   a processor host bridge (PHB) connected to a single central processing unit;
   a first switch directly connected to the PHB and directly connected to a second switch;
   a peripheral component interconnect express (PCI-E) switch directly connected to the first switch and directly connected to the second switch, wherein the first switch and the second switch each perform significantly faster than the PCI-E switch;
   a first PCI-E slot directly connected to the second switch; and
   a second PCI-E slot directly connected to the PCI-E switch.

2. The system according to claim 1, wherein
   the connection between the first switch and the PHB, the connection between the second switch and the first switch, the connection between the PCI-E switch and the first switch, the connection between the PCI-E switch and the second switch, and the connection between the PCI-E slot and the second switch each comprise a bi-directional bus.

3. The system according to claim 1, further comprising:
   a group of PCI-E slots connected to the PCI-E switch.

4. The system according to claim 1, wherein a first mode of operation comprises:
   the first switch set to connect the PHB and the PCI-E switch; and
   the second switch set to connect the PCI-E switch and the first PCI-E slot.

5. The system according to claim 1, wherein a second mode of operation comprises:
   the first switch and the second switch set to connect the PHB and the first PCI-E slot.

6. The system according to claim 5, wherein in the second mode of operation all resources managed by the PHB are available at the first PCI-E slot.

7. The system according to claim 5, wherein the first PCI-E slot is initialized as a PHB direct slot by a hypervisor.

8. A system, the system comprising:
   a first bus directly connecting a processor host bridge (PHB) and a first switch;
   a second bus directly connecting the first switch and a second switch;
   a third bus directly connecting the second switch and a first PCI-E slot;
   a fourth bus directly connecting the first switch and a peripheral component interconnect express (PCI-E) switch;
   a fifth bus directly connecting the PCI-E switch and the second switch; and
   a sixth bus directly connecting the PCI-E switch and a second PCI-E slot, wherein a direct connection from the PHB to the first PCI-E slot through the first bus, the first switch, the second bus, the second switch and the third bus does not comprise the peripheral component interconnect express (PCI-E) switch, and the first switch and the second switch each perform significantly faster than the PCI-E switch.

9. The system according to claim 8, further comprising:
   a first position of the first switch connecting the first bus and the second bus; and
   a first position of the second switch connecting the second bus and the third bus.

10. The system according to claim 8, further comprising:
    a fourth bus connecting the first switch and a peripheral component interconnect express (PCI-E) switch; and
    a fifth bus connecting the PCI-E switch and the second switch.

11. The system according to claim 10, further comprising:
    a second position of the first switch connecting the first bus and the fourth bus; and
    a second position of the second switch connecting the fifth bus and the third bus.

12. The system according to claim 8, wherein all resources managed by the PHB are available at the PCI-E slot.

13. The system according to claim 12, wherein the resources are selected from a group consisting of: Partitionable Endpoint Numbers, an amount of memory-mapped I/O (MMIO) address space, an amount of direct memory access (DMA) address space, and Message Signaled Interrupts (MSIs).

14. The system according to claim 8, wherein the first bus, the second bus, the third bus, the fourth bus, and the fifth bus each comprise a bi-directional bus.

15. The system according to claim 8, further comprising:
    an expansion module inserted into the PCI-E slot.

16. A processor-implemented method for allocating resources managed by a processor host bridge (PHB) to a single peripheral component interconnect express (PCI-E) slot, the method comprising:
    controlling a first switch and a second switch in order to connect the PHB directly to the single PCI-E slot upon initialization of a system, wherein the first switch is directly connected to the PHB and second switch, wherein the second switch is directly connected between the first switch and the first PCI-E slot, and a PCI-E switch is directly connected between the first switch and the second switch, and the PCI-E switch is directly connected between the first switch and a second PCI-E slot, and the first switch and the second switch are each significantly faster than the PCI-E switch.

17. The method according to claim 16, further comprising:
    allocating all resources of the PHB to the PCI-E slot.

18. The method according to claim 17, wherein the resources are selected from a group consisting of: bandwidth, Partitionable Endpoint Numbers, MMIO Windows, and Message Signaled Interrupts (MSIs).

19. The method according to claim 16, wherein the first bus, the second bus, and the third bus each comprise a bi-directional bus.

20. The method according to claim 16, further comprising:
inserting an expansion module in the PCI-E slot.

* * * * *